US012122021B2

(12) United States Patent
Yang

(10) Patent No.: US 12,122,021 B2
(45) Date of Patent: Oct. 22, 2024

(54) ANGLE ADJUSTMENT STRUCTURE FOR PRESSING HAND TOOL

(71) Applicant: Te-Chuan Yang, Taichung (TW)

(72) Inventor: Te-Chuan Yang, Taichung (TW)

( * ) Notice: Subject to any disclaimer, the term of this patent is extended or adjusted under 35 U.S.C. 154(b) by 317 days.

(21) Appl. No.: 17/841,807

(22) Filed: Jun. 16, 2022

(65) Prior Publication Data

US 2022/0305628 A1 Sep. 29, 2022

Related U.S. Application Data

(63) Continuation-in-part of application No. 16/925,607, filed on Jul. 10, 2020, now abandoned.

(51) Int. Cl.

*B25B 23/00* (2006.01)
*B25B 23/16* (2006.01)
*B25B 13/04* (2006.01)
*B25B 13/46* (2006.01)

(52) U.S. Cl.

CPC .......... *B25B 23/0028* (2013.01); *B25B 23/16* (2013.01); *B25B 13/04* (2013.01); *B25B 13/462* (2013.01)

(58) Field of Classification Search

CPC ..... B25B 13/46; B25B 13/06; B25B 23/0028; B25B 23/16; F16C 11/04; F16C 11/10
USPC .................................... 81/77.9, 177.7, 177.8
See application file for complete search history.

(56) References Cited

U.S. PATENT DOCUMENTS

2004/0231472 A1* 11/2004 Lin ........................ B25G 1/063 81/177.8
2021/0187710 A1* 6/2021 Winnard ................ F16C 11/04

* cited by examiner

*Primary Examiner* — Eric J Rosen
*Assistant Examiner* — Robert C Moore
(74) *Attorney, Agent, or Firm* — Demian K. Jackson; Jackson IPG PLLC

(57) ABSTRACT

An angle adjustment structure for pressing a hand tool comprising: a first handle, a second handle, a first spring washer, a second spring washer, a return spring, a first presser, a second presser, a first fastener and a second fastener. The first handle includes a contact sheet having a first thickness, a first toothed orifice. The second handle includes a groove having a second thickness, a second toothed orifice, a first fixing plate and a second fixing plate. A profile of the second toothed orifice is identical to a profile of the first toothed orifice. The return spring is defined on the first presser and the second presser. The first handle and the second handle adjust the angle when the first presser and second presser are pressed simultaneously, and being fixed by the first fastener and second fastener to avoid a removal.

5 Claims, 8 Drawing Sheets

ANGLE ADJUSTMENT STRUCTURE FOR PRESSING HAND TOOL

This application is a Continuation-in-Part of application Ser. No. 16/925,607, filed Jul. 10, 2020.

BACKGROUND OF THE INVENTION

Field of the Invention

The present invention relates to a hand tool, and more particularly to an angle adjustment structure for pressing the hand tool to adjust an angle between a first handle and a second handle, and the first handle and the second handle are fixed to rotate a workpiece after adjusting the angle.

Description of the Prior Art

A conventional hand tool, such as a wrench, is used widely in different spaces. The hand tool has a fixed shape and length, so it is inconvenient to apply the hand tool in an angled space. To overcome this problem, the hand tool has two handles connected so that the two handles are rotated to adjust an angle between the two handles. However, the handles are driven to rotate by a single drive element, such as a switch, and the switch is pressed or rotated to release a limitation of the two handles, thus rotating the two handles.

However, when operating the hand tool and shifting the switch accidentally, the two handles are released to stop a desired operation of the hand tool or to cause using danger.

The present invention has arisen to mitigate and/or obviate the afore-described disadvantages.

SUMMARY OF THE INVENTION

The primary object of the present invention is to provide an angle adjustment structure for pressing a hand tool which when rotating a first handle and a second handle to adjust an angle between the first handle and the second handle, the two pressers beside the second handle have to be pressed simultaneously. In other words, when one of the two pressers is pressed merely, the first handle and the second handle are not rotated to adjust the angle so as to avoid a rotation of the first handle and the second handle in case pressing the one presser only, thus obtaining using safety.

To provide above-mentioned objects, an angle adjustment structure for pressing a hand tool provided by the present invention contains: a first handle, a second handle, a first spring washer, a second spring washer, a return spring, a first presser, a second presser, a first fastener and a second fastener.

The first handle includes a contact sheet formed on a first end thereof and having a first thickness and a first cross dotted line. An intersected point of the first cross dotted line is a first dotted central point, and the contact sheet further has a first toothed orifice passing therethrough. The first toothed orifice has multiple teeth equidistantly arranged around an inner wall thereof, and a center of the first toothed orifice is the first dotted central point, the first handle further includes a first positioning portion and a second positioning portion formed on a top and a bottom of the contact sheet of the first handle and on the inner wall of the first toothed orifice. The first positioning portion and the second positioning portion are formed in a groove shape, and a center of the first positioning portion and the second positioning portion is the first dotted central point. The first positioning portion and the second positioning portion are concentric with the first toothed orifice, a first spaced portion is defined between the first positioning portion and the first toothed orifice, a second spaced portion is defined between the second positioning portion and the first toothed orifice, such that the first positioning portion is separated a distance from the first toothed orifice, and the second positioning portion is separated a distance from the first toothed orifice, the first spaced portion is higher than the first positioning portion, and the second spaced portion is higher than the second positioning portion, the first positioning portion is configured to receive the first spring washer, and the second positioning portion is configured to receive the second spring washer.

The return spring is defined between the first presser and second presser.

The first presser including a first pressing portion formed on an outer wall thereof and configured to be pressed by a user, a first slot defined outside the first pressing portion, and a first notch and a first toothed column which are arranged inside the first slot. The first toothed column contacts with the second toothed orifice and the first toothed orifice, and the first presser further includes a first fixing portion arranged on an inner wall thereof and being dented.

The second presser including a second pressing portion formed on an outer wall thereof and configured to be pressed by a user, a second slot defined outside the second pressing portion, and a second notch and a second toothed column which are arranged inside the second slot. The second toothed column contacts with the third toothed orifice and the first toothed orifice, and the second presser further includes a second fixing portion arranged on an inner wall thereof and being dented.

The first fastener engaged between the second handle and the first presser to limit the first presser to operate among the second toothed orifice, the first trench, the first toothed orifice, and the second fastener engaged between the second handle and the second presser to limit the second presser to operate among the third toothed orifice, the second trench, the first toothed orifice.

The contact sheet of the first handle is engaged into the groove of the second handle, the first dotted central point, the second dotted central point and the third dotted central point are located on an axial center, the first spring washer is defined between the contact sheet and the first fixing plate to be fixed by the first positioning portion, and the second spring washer is defined between the contact sheet and the second fixing plate to be fixed by the second positioning portion, the first toothed orifice is aligned with the second toothed orifice and the third toothed orifice, the first toothed columns of the first presser is retained into the first toothed orifice via the second toothed orifice, and the second toothed columns of the second presser is retained into the first toothed orifice via the third toothed orifice. The return spring is defined between the first presser and the second presser, and the return spring is fixed by the first fixing portion and second fixing portion so that the first presser and the second presser are pushed outward by the return spring; when the first fastener is fixed between the second handle and the first presser, and the second fastener is fixed between the second handle and the second presser, the first presser and second presser are pressed; when releasing the first presser and second presser, the first presser and second presser are pushed outward by the return spring and is fixed by the first fastener and second fastener to avoid a removal.

DETAILED DESCRIPTION OF THE PREFERRED EMBODIMENTS

Figure 1:
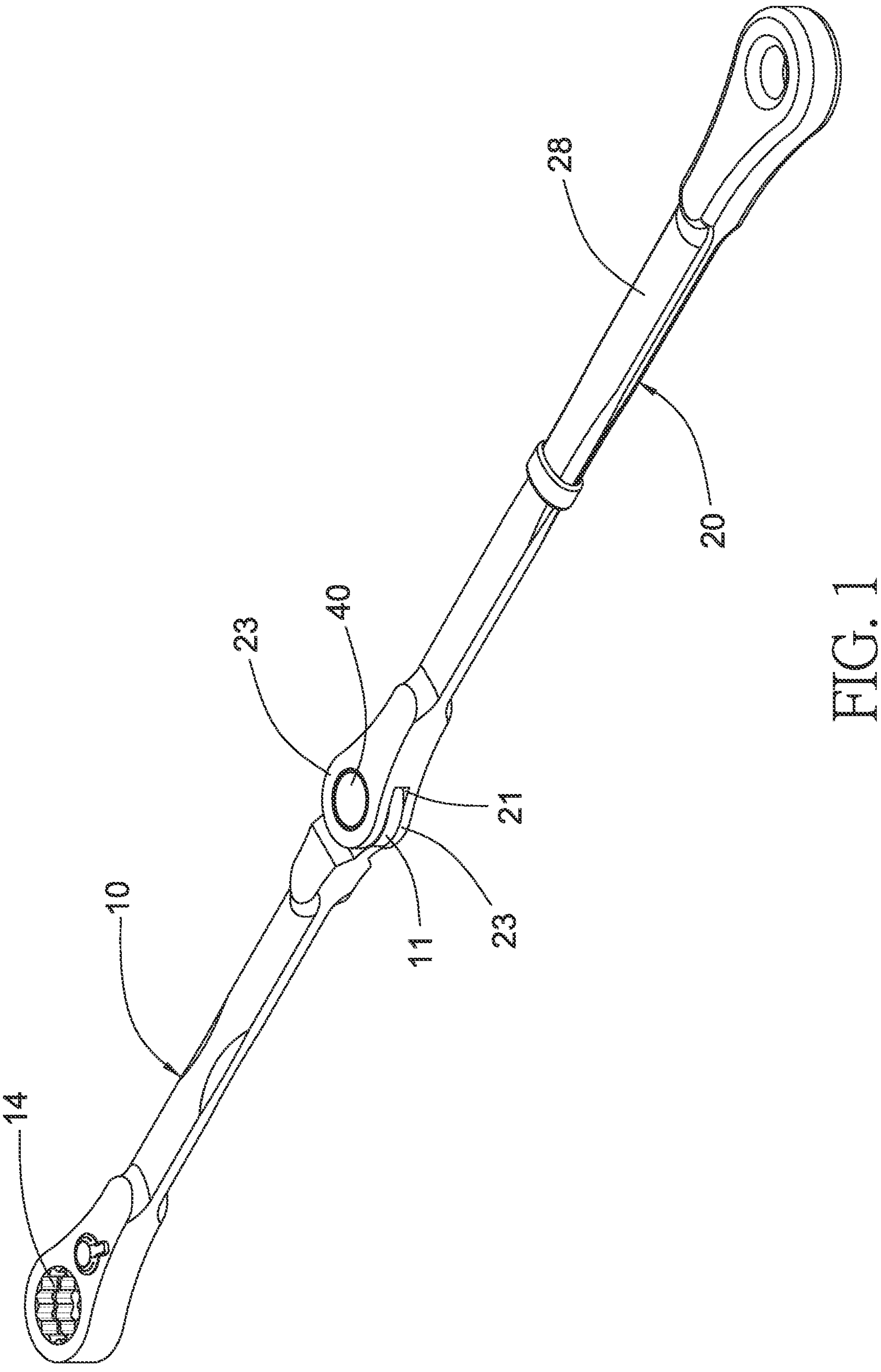
FIG. 1 is a perspective view showing the assembly of an angle adjustment structure for pressing a hand tool according to a preferred embodiment of the present invention.
Figure 2:
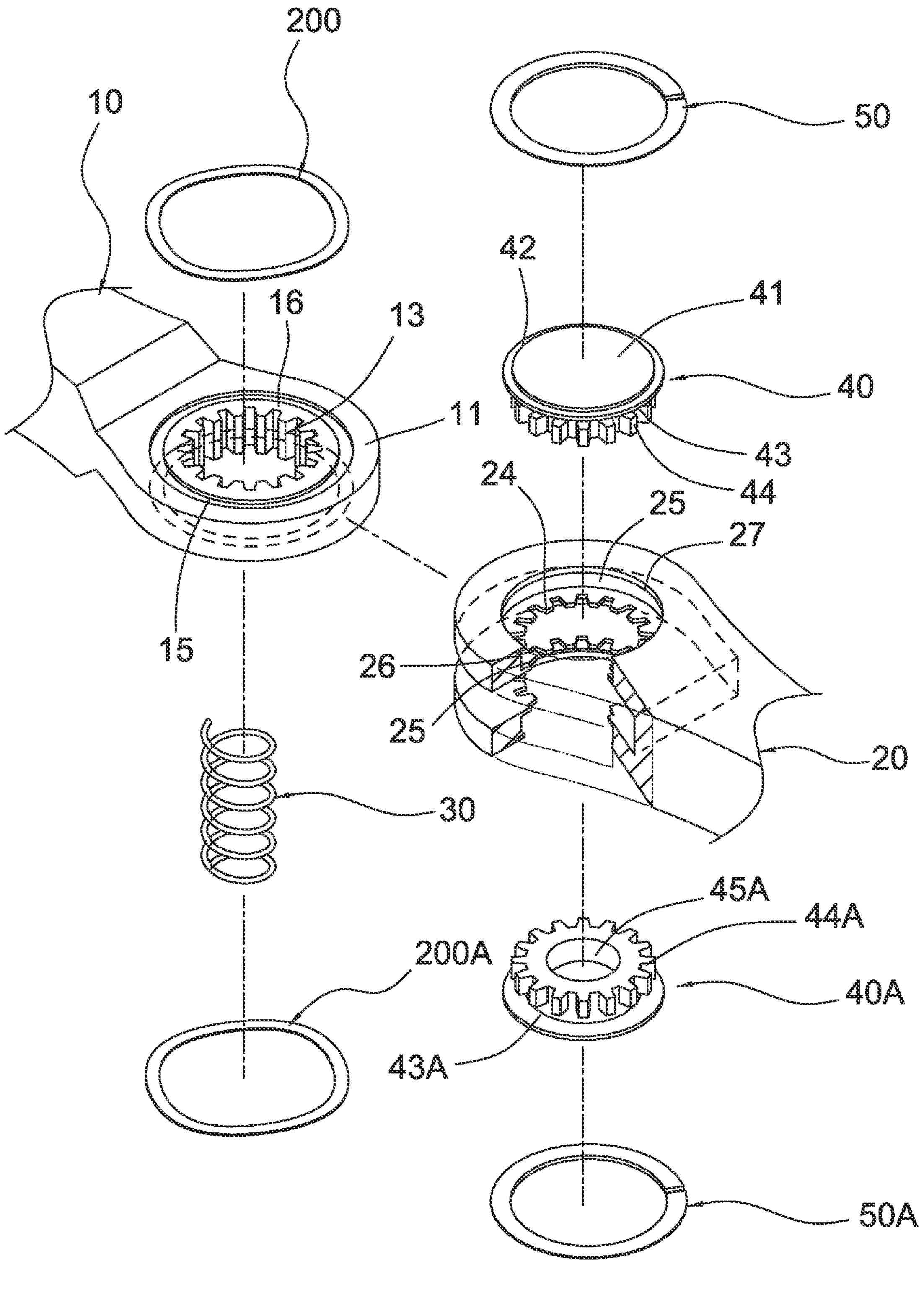
FIG. 2 is a perspective view showing the exploded components of the angle adjustment structure for pressing the hand tool according to the preferred embodiment of the present invention.
Figure 3:
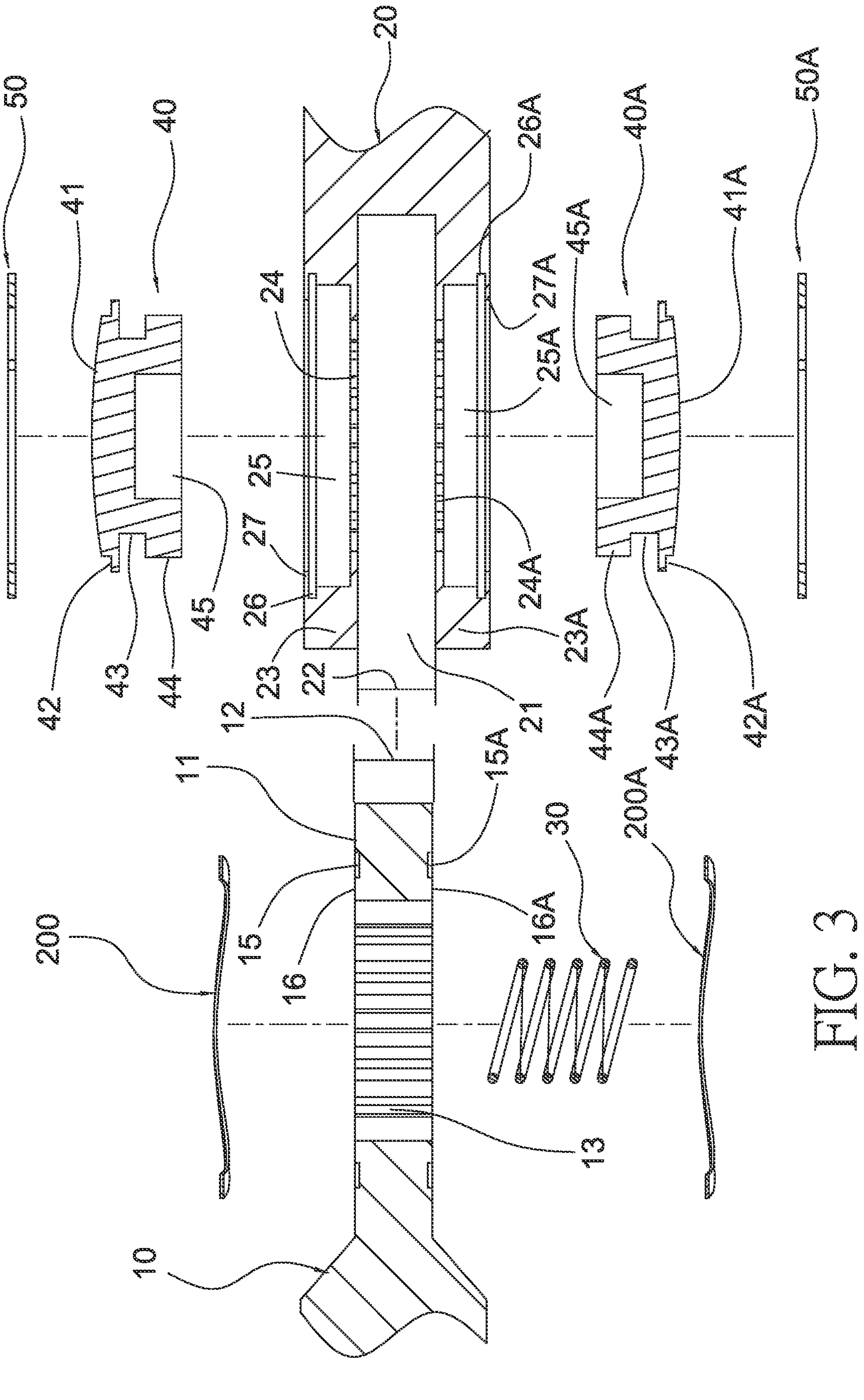
FIG. 3 is a cross sectional view showing the exploded components of the angle adjustment structure for pressing the hand tool according to the preferred embodiment of the present invention.
Figure 4:
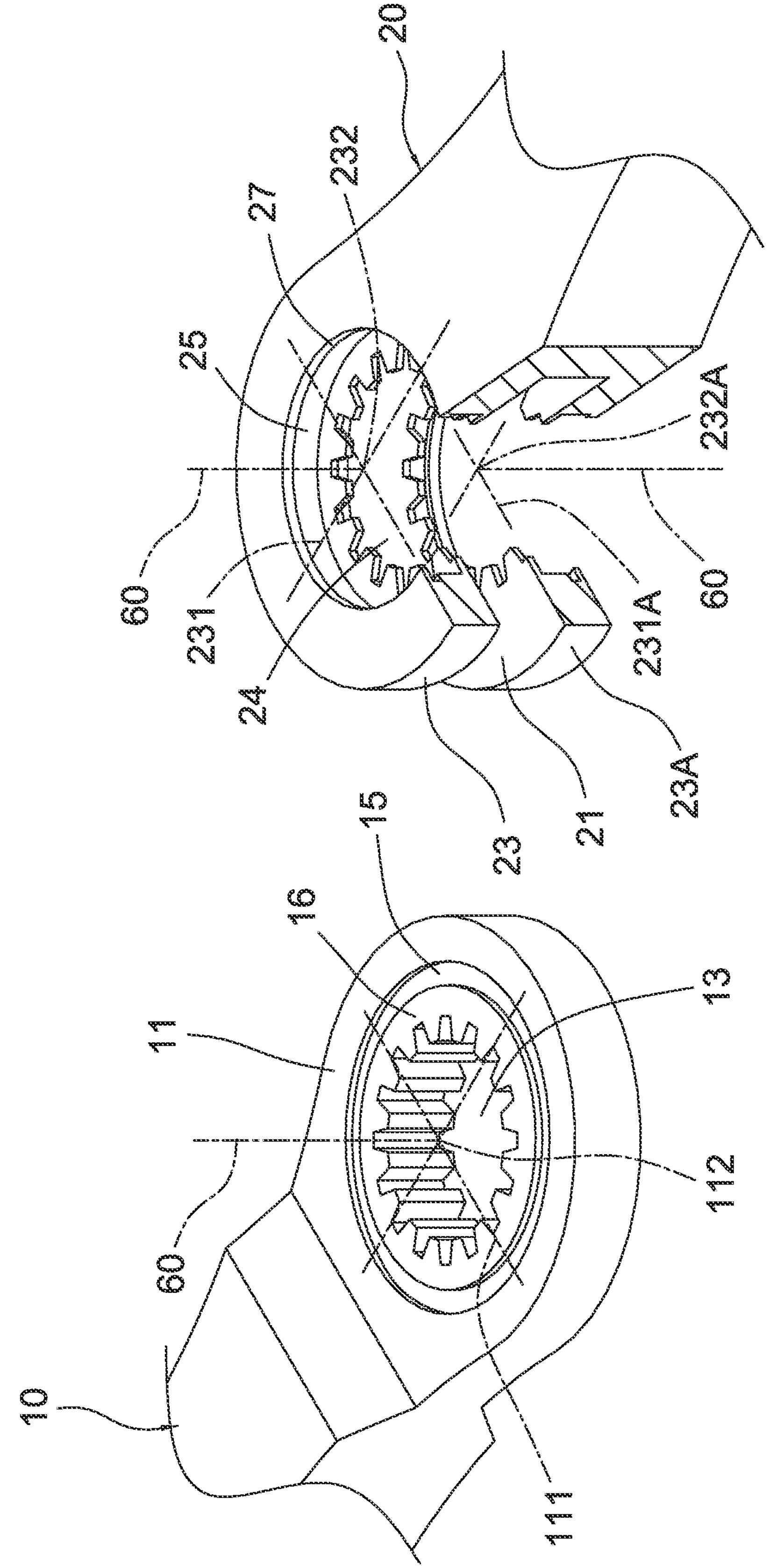
FIG. 4 is a perspective view showing a part of the angle adjustment structure for pressing the hand tool according to the preferred embodiment of the present invention.
Figure 5:
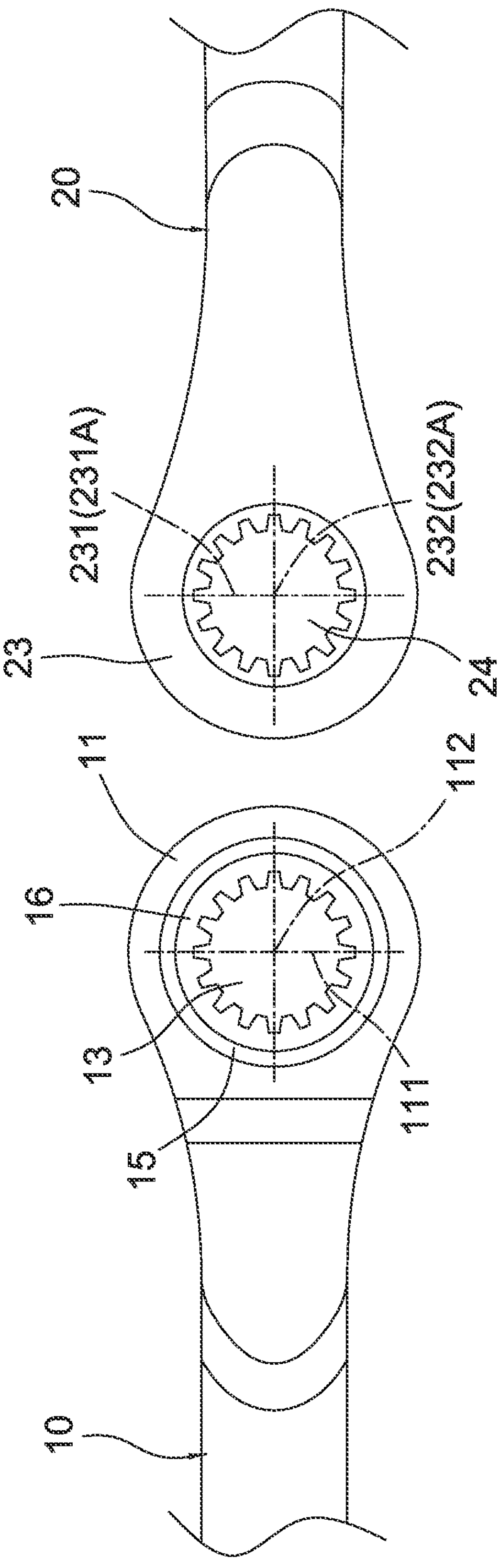
FIG. 5 is a side plan view showing a part of the angle adjustment structure for pressing the hand tool according to the preferred embodiment of the present invention.
Figure 6:
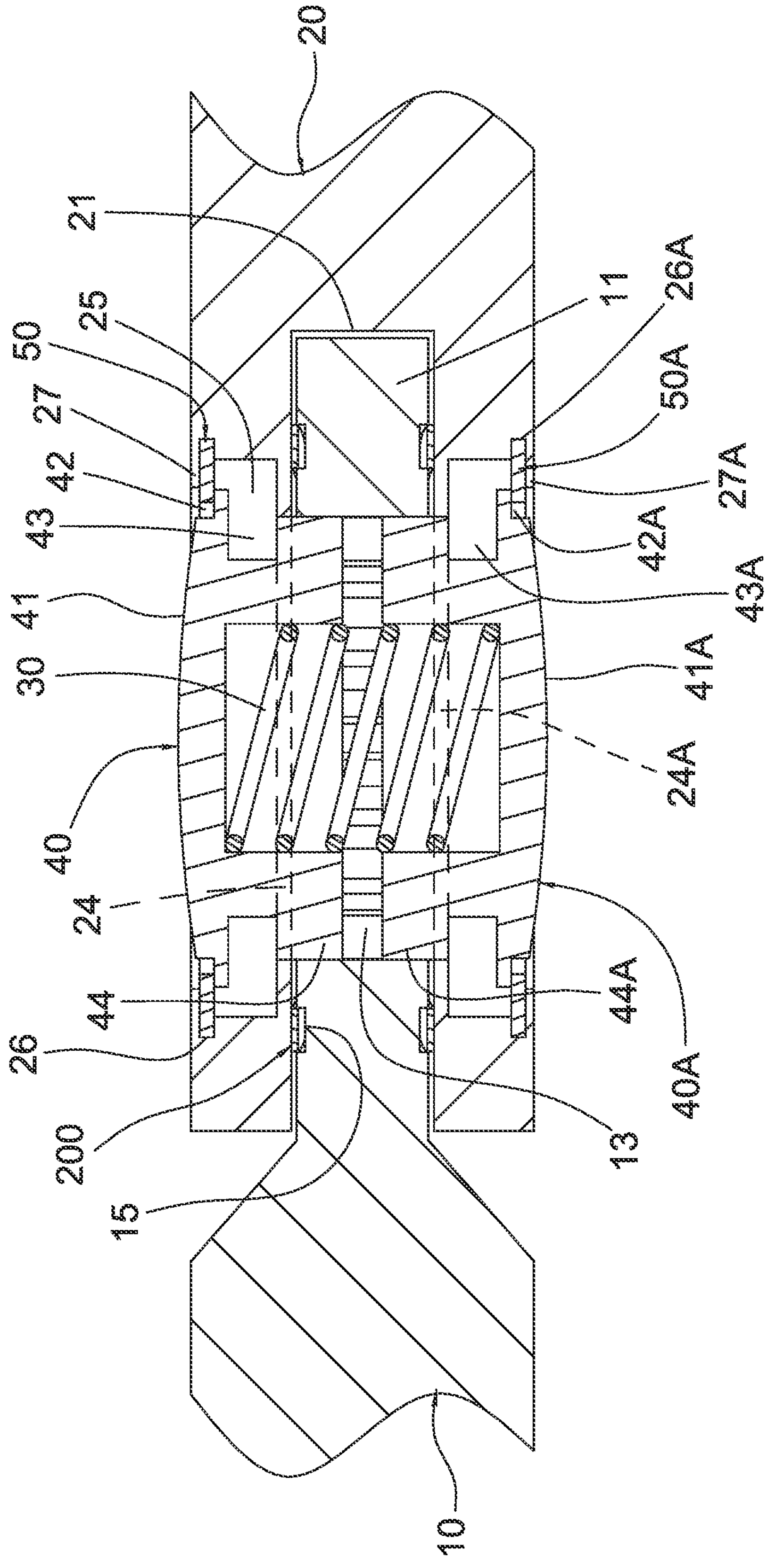
FIG. 6 is a cross sectional view showing the operation of the angle adjustment structure for pressing the hand tool according to the preferred embodiment of the present invention.

The present invention will be clearer from the following description when viewed together with the accompanying drawings, which show, for purpose of illustrations only, a preferred embodiment in accordance with the present invention.

With reference to FIGS. 1 to 6, an angle adjustment structure for pressing a hand tool according to a preferred embodiment of the present invention comprises: a first handle 10, a second handle 20, a first spring washer 200, a second spring washer 200A, a return spring 30, a first presser 40, a second presser 40A, a first fastener 50 and a second fastener 50A.

The first handle 10 includes a contact sheet 11 formed on a first end thereof and having a first thickness 12 and a first cross dotted line 111, wherein an intersected point of the first cross dotted line 111 is a first dotted central point 112, and the contact sheet 11 further has a first toothed orifice 13 passing therethrough, wherein the first toothed orifice 13 has multiple teeth equidistantly arranged around an inner wall thereof, and a center of the first toothed orifice 13 is the first dotted central point 112, the first handle 10 further includes a receiving orifice 14 defined on a second end thereof and configured to fit with a screw or a nut, a first positioning portion 15 and a second positioning portion 15A formed on a top and a bottom of the contact sheet 11 of the first handle 10 and on the inner wall of the first toothed orifice 13, wherein the first positioning portion 15 and second positioning portion 15A are formed in a groove shape, and a center of the first positioning portion 15 and the second positioning portion 15A are the first dotted central point 112, wherein the first positioning portion 15 and the second positioning portion 15A are concentric with the first toothed orifice 13, and a first spaced portion 16 is defined between the first positioning portion 15 and the first toothed orifice 13, and a second spaced portion 16A is defined between the second positioning portion 15A and the first toothed orifice 13, such that the first positioning portion 15 and the second positioning portion 15A are respectively separated a distance from the first toothed orifice 13, the first spaced portion 16 is higher than the first positioning portion 15, the second spaced portion 16A is higher than the second positioning portion 15A, the first positioning portions 15 is configured to receive the first spring washer 200, and the second positioning portions 15A is configured to receive the second spring washer 200A.

The second handle 20 includes a groove 21 defined on a first end thereof and having a second thickness 22, wherein the second thickness 22 is greater than the first thickness 12, and the second handle 20 includes a first fixing plate 23 and a second fixing plate 23A which extend from a top and a bottom of the groove 21, wherein the first fixing plate 23 has a second cross dotted line 231 defined thereon, an intersected point of the second cross dotted line 231 is a second dotted central point 232, and the first fixing plate 23 further has a second toothed orifice 24 formed thereon adjacent to the groove 21, a first trench 25 defined on an outer wall of the second toothed orifice 24, and a first recess 26 and a first limiting fringe 27 which are formed on an outer wall of the first trench 25, wherein the second toothed orifice 24, the first trench 25, the first recess 26 and the first limiting fringe 27 are arranged along the second dotted central point 232, wherein the second toothed orifice 24, the first trench 25, the first recess 26 and the first limiting fringe 27 are concentric with the second dotted central point 232. The second fixing plate 23A has a third cross dotted line 231A defined thereon, wherein an intersected point of the third cross dotted line 231A is a third dotted central point 232A, and the second fixing plate 23A further has a third toothed orifice 24A formed thereon proximate to the groove 21, a second trench 25A defined on an outer wall of the third toothed orifice 24A, and a second recess 26A and a second limiting fringe 27A which are formed on an outer wall of the second trench 25A, wherein the third toothed orifice 24A, the second trench 25A, the second recess 26A and the second limiting fringe 27A are arranged along the third dotted central point 232A, wherein the second recess 26A and the second limiting fringe 27A are concentric with the third dotted central point 232A. A profile of the second toothed orifice 24 and the third toothed orifice 24A is identical to a profile of the first toothed orifice 13, and the second handle 20 further includes a grip portion 28 formed on a second end thereof and configured to be gripped by a user. the first spring washer 200 abuts against the first positioning portion 15 of the top of the contact sheet 11 and the top of the groove 21, and the second spring washer 200A abuts against the second positioning portion 15A of the bottom of the contact sheet 11 and the bottom of the groove 21, such that the contact sheet 11 is located on a central position of the groove 21, wherein a distances between the top of the contact sheet 11 and the groove 21 is equal to a distance between the bottom of the contact sheet 11 and the groove 21.

The first presser 40 includes a first pressing portion 41 formed on an outer wall thereof and configured to be pressed by the user, a first slot 42 defined outside the first pressing portion 41, and a first notch 43 and a first toothed column 44 which are arranged inside the first slot 42, wherein the first toothed column 44 contacts with the second toothed orifice 24 and the first toothed orifice 13, and the first presser 40 further includes a first fixing portion 45 arranged on an inner wall thereof and configured to fit with the return spring 30, wherein the first fixing portion 45 is dented.

The second presser 40A includes a second pressing portion 41A formed on an outer wall thereof and configured to be pressed by the user, a second slot 42A defined outside the second pressing portion 41A, and a second notch 43A and a second toothed column 44A which are arranged inside the second slot 42A, wherein the second toothed column 44A contacts with the second toothed orifice 24A and the first toothed orifice 13, and the second presser 40A further includes a second fixing portion 45A arranged on an inner wall thereof and configured to fit with the return spring 30, wherein the second fixing portion 45A is dented.

The return spring 30 is defined between the first fixing portions 45 of the first presser 40 and the second fixing portions 45A of the second presser 40A.

The first fastener 50 is engaged between the first recess 26 of the second handle 20 and the first slot 42 of the first presser 40, to limit the first presser 40 to operate among the second toothed orifice 24, the first trench 25, the first recess 26 and the first toothed orifice 13.

The second fastener 50A is engaged between the second recess 26A of the second handle 20 and the second slot 42A of the second presser 40A, to limit the second presser 40A to operate among the third toothed orifice 24A, the second trench 25A, the second recess 26A and the first toothed orifice 13.

The contact sheet 11 of the first handle 10 is engaged into the groove 21 of the second handle 20, the first dotted central point 112, the second dotted central point 232 and the third dotted central point 232A are located on an axial center 60, the first spring washer 200 is defined between the contact sheet 11 and the first fixing plate 23 to be fixed by the first positioning portion 15, the second spring washer 200A is defined between the contact sheet 11 and the second fixing plate 23A to be fixed by the second positioning portion 15A, so that the contact sheet 11 of the first handle 10 is located on the central position of the groove 21 of the second handle 20. The first toothed orifice 13 is aligned with the second toothed orifice 24 and the third toothed orifice 24A, and the first toothed columns 44 of the first presser 40 is retained into the first toothed orifice 13 via the second toothed orifice 24, and the second toothed columns 44A of the second presser 40A is retained into the first toothed orifice 13 via the third toothed orifice 24A. Since the first spaced portion 16 is defined between the first positioning portion 15 and the first toothed orifice 13, and the second spaced portion 16A is defined between the second positioning portion 15A and the first toothed orifice 13, the first spring washer 200 of the first positioning portion 15 does not contact the first toothed column 44 of the first presser 40, and the second spring washer 200A of the second positioning portion 15A does not contact the second toothed column 44A of the second presser 40A, thus avoiding interference of the first spring washer 200 to the first presser 40, and avoiding interference of the second spring washer 200A to the second presser 40A. The return spring 30 is defined between the first presser 40 and the second presser 40A is fixed by the first fixing portion 45 and the second fixing portion 45A, thus the first presser 40 and the second presser 40A are pushed outward by the return spring 30, when the first fastener 50 is fixed between the first slot 42 and the first recess 26, and the second fastener 50A is fixed between the second slot 42A and the second recess 26A, wherein the first presser 40 and the second presser 40A are pressed equally by using the first spring washer 200 and the second spring washer 200A. When releasing the first presser 40 and the second presser 40A, the first presser 40 and the second presser 40A are pushed outward by the return spring 30 and are fixed by the first fastener 50 and the second fastener 50A to avoid a removal so that the first presser 40 and the second presser 40A are pressed and moved back to two original positions within a determined moving range.

When the first presser 40 and the second presser 40A are not pressed and are pushed outward by the return spring 30, the first toothed columns 43 are located between the second toothed orifice 24 and the first toothed orifice 13, and the second toothed columns 43A are located between the third toothed orifice 24A and the first toothed orifice 13, hence the first toothed columns 43 connect with the second toothed orifice 24 and the first toothed orifice 13, and the second toothed columns 43A connect with the third toothed orifice 24A and the first toothed orifice 13, so that the first handle 10 and the second handle 20 are connected and actuated.

Figure 7:
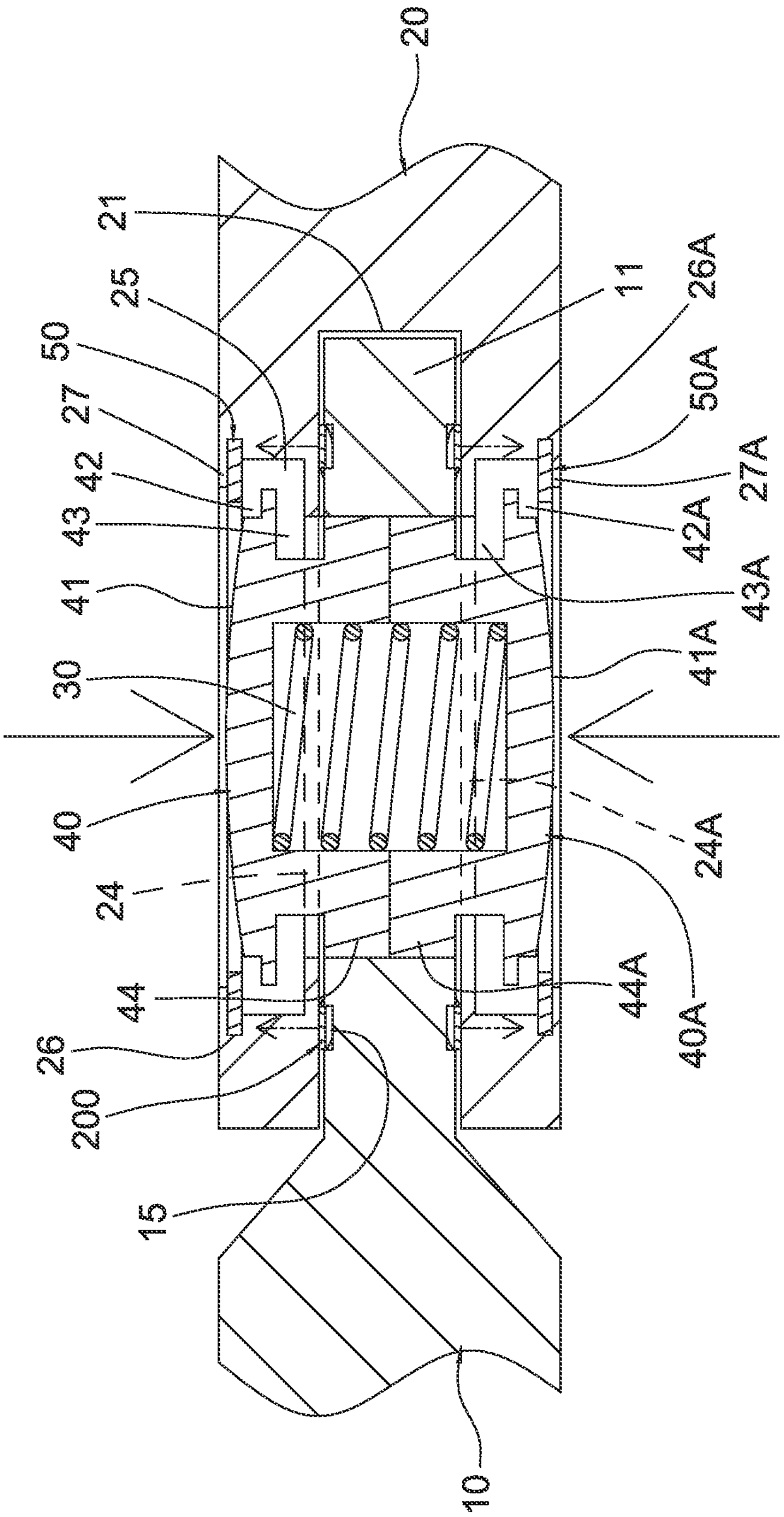
FIG. 7 is another cross sectional view showing the operation of the angle adjustment structure for pressing the hand tool according to the preferred embodiment of the present invention.
Figure 8:
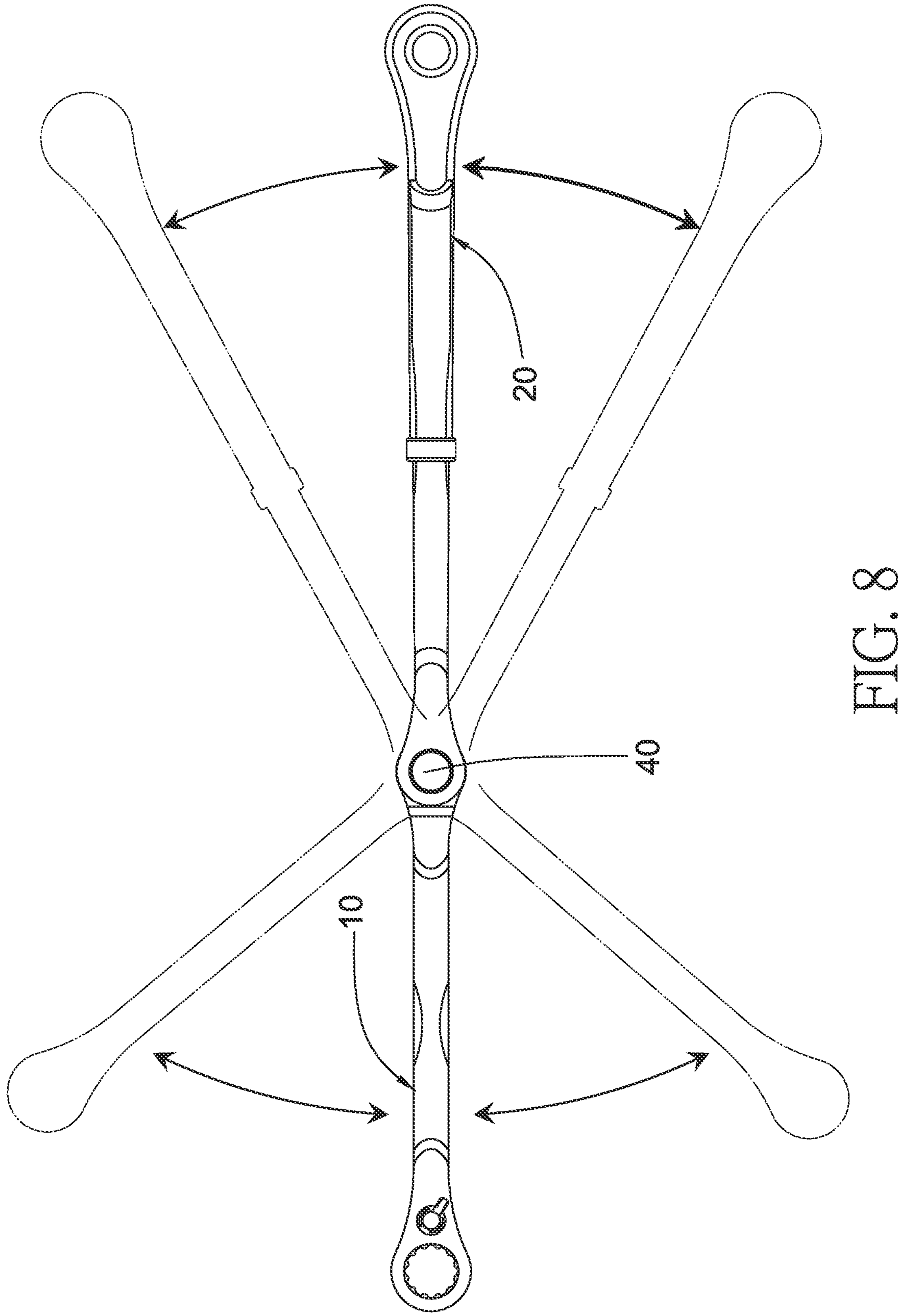
FIG. 8 is a side plan view showing the operation of the angle adjustment structure for pressing the hand tool according to the preferred embodiment of the present invention.

When the first presser 40 and the second presser 40A are pressed simultaneously, as shown in FIGS. 7 and 8, the first toothed columns 43 remove from the second toothed orifice 24, the second toothed columns 43A remove from the third toothed orifice 24A, so that the first handle 10 and the second handle 20 are not connected and actuated, and the first handle 10 and the second handle 20 are rotated to adjust a desired angle between the first handle 10 and the second handle 20, then the first presser 40 and second presser 40A are released to be pushed outward by the return spring 30, the first toothed columns 43 is engaged between the second toothed orifice 24 and the first toothed orifice 13, and the second toothed columns 43A is engaged between the third toothed orifice 24A and the first toothed orifice 13, so that the first handle 10 and the second handle 20 are connected and actuated, thus rotating the handle tool.

The first presser 40 and the second presser 40A are controlled by the return spring 30, so when the first presser 40 is pressed merely, the second presser 40A is configured to fix the first handle 10 and the second handle 20, also when the second presser 40A is pressed merely, the first presser 40 is configured to fix the first handle 10 and the second handle 20 to avoid a rotation of the first handle 10 and the second handle 20.

Accordingly, when rotating the first handle 10 and the second handle 20 to adjust the angle between the first handle 10 and the second handle 20, the first presser 40 and the second presser 40A beside the second handle 20 have to be pressed simultaneously. In other words, when the presser 40 or the presser 40A is pressed merely, the first handle 10 and the second handle 20 are not rotated to adjust the angle so as to avoid a rotation of the first handle and the second handle 20 in case pressing the one presser 40 only, thus obtaining using safety.

While various embodiments in accordance with the present invention have been shown and described, it is clear to those skilled in the art that further embodiments may be made without departing from the scope of the present invention.

What is claimed is:

1. An angle adjustment structure for pressing a hand tool comprising: a first handle, a second handle, a first spring washer, a second spring washer, a return spring, a first presser, a second presser, a first fastener and a second fastener;

the first handle includes a contact sheet formed on a first end thereof and having a first thickness and a first cross dotted line, wherein an intersected point of the first cross dotted line is a first dotted central point, and the contact sheet further has a first toothed orifice passing therethrough, wherein the first toothed orifice has multiple teeth equidistantly arranged around an inner wall thereof, and a center of the first toothed orifice is the first dotted central point, the first handle further includes a first positioning portion and a second positioning portion formed on a top and a bottom of the contact sheet of the first handle and on the inner wall of the first toothed orifice, wherein the first positioning portion and the second positioning portion are formed in a groove shape, and a center of the first positioning portion and the second positioning portion is the first dotted central point, wherein the first positioning portion and the second positioning portion are concentric with the first toothed orifice, a first spaced portion is defined between the first positioning portion and the first toothed orifice, a second spaced portion is defined between the second positioning portion and the first toothed orifice, such that the first positioning portion is separated a distance from the first toothed orifice, and the second positioning portion is separated a distance from the first toothed orifice, the first spaced portion is higher than the first positioning portion, and the second spaced portion is higher than the second positioning portion, the first positioning portion is configured to receive the first spring washer, and the second positioning portion is configured to receive the second spring washer;

the second handle including a groove defined on a first end thereof and having a second thickness, wherein the second thickness is greater than the first thickness, and the second handle includes a first fixing plate and a second fixing plate which extend from a top and a bottom of the groove, wherein the first fixing plate has a second cross dotted line defined thereon, an intersected point of the second cross dotted line is a second dotted central point, and the first fixing plate further has a second toothed orifice formed thereon adjacent to the groove, a first trench defined on an outer wall of the second toothed orifice, a first recess is formed on an outer wall of the first trench, wherein the second toothed orifice, the first trench, the first recess are arranged along the second dotted central point, the second toothed orifice, the first trench, the first recess are concentric with the second dotted central point, wherein the second fixing plate has a third cross dotted line defined thereon, an intersected point of the third cross dotted line is a third dotted central point, and the second fixing plate further has a third toothed orifice formed thereon proximate to the groove, a second trench defined on an outer wall of the third toothed orifice, a second recess is formed on an outer wall of the second trench, wherein the third toothed orifice, the second trench, the second recess are arranged along the third dotted central point, the third toothed orifice, the second trench, the second recess are concentric with the third dotted central point, wherein a profile of the second toothed orifice and the third toothed orifice is identical to a profile of the first toothed orifice, the first spring washer abuts against the top of the first positioning portion of the contact sheet and the top of the groove, and the second spring washer abuts against the bottom of the second positioning portion of the contact sheet and the bottom of the groove, the contact sheet is located on a central position of the groove, wherein a distances between the tops of the contact sheet and the groove is equal to a distance between the bottoms of the contact sheet and the groove;

the return spring is defined between the first presser and second presser;

the first presser including a first pressing portion formed on an outer wall thereof and configured to be pressed by a user, a first slot defined outside the first pressing portion, and a first notch and a first toothed column which are arranged inside the first slot, wherein the first toothed column contacts with the second toothed orifice and the first toothed orifice, and the first presser further includes a first fixing portion arranged on an inner wall thereof and being dented;

the second presser including a second pressing portion formed on an outer wall thereof and configured to be pressed by a user, a second slot defined outside the second pressing portion, and a second notch and a second toothed column which are arranged inside the second slot, wherein the second toothed column contacts with the third toothed orifice and the first toothed orifice, and the second presser further includes a second fixing portion arranged on an inner wall thereof and being dented;

the first fastener engaged between the second handle and the first presser to limit the first presser to operate among the second toothed orifice, the first trench, the first toothed orifice;

the second fastener engaged between the second handle and the second presser to limit the second presser to operate among the third toothed orifice, the second trench, the first toothed orifice;

wherein the contact sheet of the first handle is engaged into the groove of the second handle, the first dotted central point, the second dotted central point and the third dotted central point are located on an axial center, the first spring washer is defined between the contact sheet and the first fixing plate to be fixed by the first positioning portion, and the second spring washer is defined between the contact sheet and the second fixing plate to be fixed by the second positioning portion, the first toothed orifice is aligned with the second toothed orifice and the third toothed orifice, the first toothed columns of the first presser is retained into the first toothed orifice via the second toothed orifice, and the second toothed columns of the second presser is retained into the first toothed orifice via the third toothed orifice, wherein the return spring is defined between the first presser and the second presser, and the return spring is fixed by the first fixing portion and second fixing portion, the first presser and the second presser are pushed outward by the return spring; when the first fastener is fixed between the second handle and the first presser, and the second fastener is fixed between the second handle and the second presser, the first presser and second presser are pressed; when releasing the first presser and second presser, the first presser and second presser are pushed outward by the return spring and is fixed by the first fastener and second fastener to avoid a removal.

2. The angle adjustment structure as claimed in claim 1, wherein the first handle includes a receiving orifice defined on a second end thereof.

3. The angle adjustment structure as claimed in claim 1, wherein the second handle further includes a grip portion formed on a second end thereof.

4. The angle adjustment structure as claimed in claim 1, wherein the first trench of the second handle has a first limiting fringe which is formed on an outer wall of the first trench, and the second trench of the second handle further has a second limiting fringe which are formed on an outer wall of the second trench, the first fastener is engaged between the first recess and the first slot of the first presser, and the second fastener is engaged between the second recess and the second slot of the second presser.

5. The angle adjustment structure as claimed in claim 1, wherein when the first presser and the second presser are not pressed and are pushed outward by the return spring, the first toothed column is located between the second toothed orifice and the first toothed orifice, and the second toothed column is located between the third toothed orifice and the first toothed orifice; when the first presser and second presser are pressed simultaneously, the first toothed column remove from the second toothed orifice and the first toothed orifice via the second toothed orifice, and the second toothed column remove from the third toothed orifice and the first toothed orifice via the third toothed orifice.

* * * * *